US012188553B1

(12) United States Patent
Ruder et al.

(10) Patent No.: US 12,188,553 B1
(45) Date of Patent: Jan. 7, 2025

(54) AUTOMOTIVE DRIVETRAIN GEARBOX INCLUDING DIFFERENTIAL HOUSING INCLUDING FLUID FLOW HOLES

(71) Applicant: Schaeffler Technologies AG & Co. KG, Herzogenaurach (DE)

(72) Inventors: Viktor Ruder, Furth (DE); Andreas Rosenwald, Nuremberg (DE); Gunter Volkel, Puschendorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/409,774

(22) Filed: Jan. 10, 2024

(51) Int. Cl.
*F16H 57/04* (2010.01)
*F16H 48/40* (2012.01)

(52) U.S. Cl.
CPC ......... *F16H 57/0483* (2013.01); *F16H 48/40* (2013.01); *F16H 2048/405* (2013.01)

(58) Field of Classification Search
CPC . F16H 48/40; F16H 2048/405; F16H 57/0483
See application file for complete search history.

(56) References Cited

U.S. PATENT DOCUMENTS 7,025,700 B1 * 4/2006 Hoelscher ............... F16H 48/34 475/89
7,229,376 B1 * 6/2007 Irwin .................. F16H 57/0483 475/160
2020/0132183 A1 * 4/2020 Günnel ............... F16H 57/0495
2020/0191255 A1 * 6/2020 Takemoto ........... F16H 57/0447
2023/0202295 A1 * 6/2023 Brolles ................. F16H 57/043 475/160

* cited by examiner

*Primary Examiner* — Edwin A Young
(74) *Attorney, Agent, or Firm* — Davidson Kappel LLC

(57) ABSTRACT

A gearbox for a motor vehicle drivetrain is provided including a gearbox housing; and a differential inside of the gearbox housing configured for driving a first output shaft and a second output shaft about a center axis and for allowing the first output shaft and the second output shaft to rotate about the center axis at different speeds. The differential includes a first side gear on a first side of the differential configured for being drivingly connected to the first output shaft; a second side gear on a second side of the differential configured for being drivingly connected to the second output shaft; a differential housing radially surrounding the first and second side gears; and a first bearing rotatably supporting the differential housing with respect to the gearbox housing. The differential housing includes axially extending holes passing therethrough from an exterior of the differential housing to an interior of the differential housing for directing fluid that is between the differential housing and the gearbox housing into the interior of the differential housing.

20 Claims, 4 Drawing Sheets

10 50d 58b 28 58c 44 52 58 50e 20 58a 38 30 50 16 35 33 46 26 CA 54 24 22 34 14 32 50a 19 50c 72
36
68
70
50e
50a
34
20c
66a
27a
20b
66b
26a
27d
20
26d
26f
27c
27e
63
27f
26a
35
27b
27
62
64b
64a
26
26b
50b
26e
26c
58

AUTOMOTIVE DRIVETRAIN GEARBOX INCLUDING DIFFERENTIAL HOUSING INCLUDING FLUID FLOW HOLES

TECHNICAL FIELD

The present disclosure relates generally to motor vehicle drivetrains, and more specifically to differentials in gearboxes for motor vehicle drivetrains.

BACKGROUND

When a differential is supplied with oil via oil sump lubrication and no pump is present to provide oil to the differential of a gearbox, oil supply is difficult, especially at low speeds and high torques.

SUMMARY

A gearbox for a motor vehicle drivetrain is provided including a gearbox housing; and a differential inside of the gearbox housing configured for driving a first output shaft and a second output shaft about a center axis and for allowing the first output shaft and the second output shaft to rotate about the center axis at different speeds. The differential includes a first side gear on a first side of the differential configured for being drivingly connected to the first output shaft; a second side gear on a second side of the differential configured for being drivingly connected to the second output shaft; a differential housing radially surrounding the first and second side gears; and a first bearing rotatably supporting the differential housing with respect to the gearbox housing. The differential housing includes axially extending holes passing therethrough from an exterior of the differential housing to an interior of the differential housing for directing fluid that is between the differential housing and the gearbox housing into the interior of the differential housing.

A BRIEF DESCRIPTION OF THE DRAWINGS

The present disclosure is described below by reference to the following drawings, in which.

DETAILED DESCRIPTION

Figure 1:
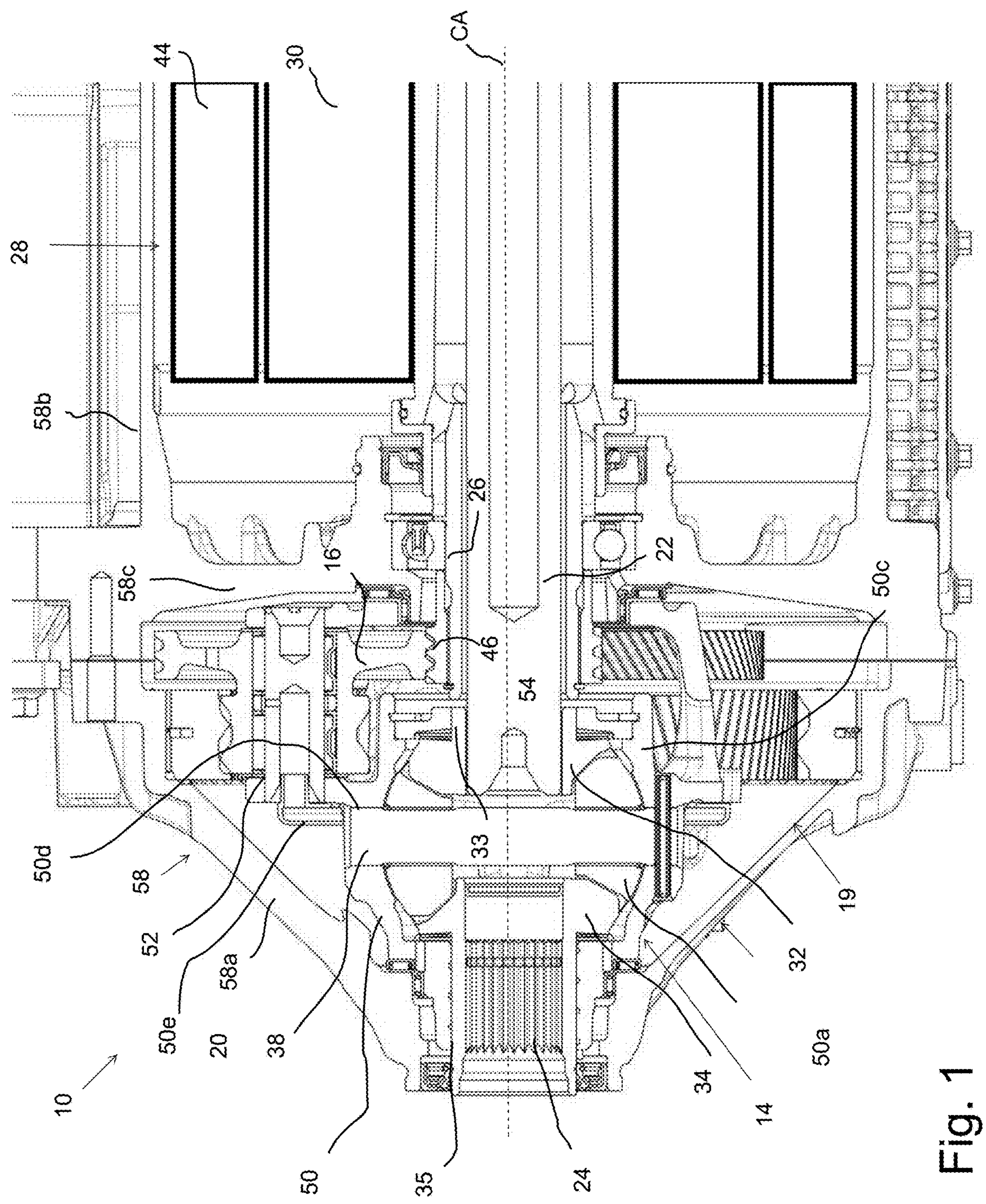
FIG. 1 shows a radial cross-sectional view of a drive unit of a motor vehicle drivetrain including a gearbox according to the present disclosure.
Figure 2:
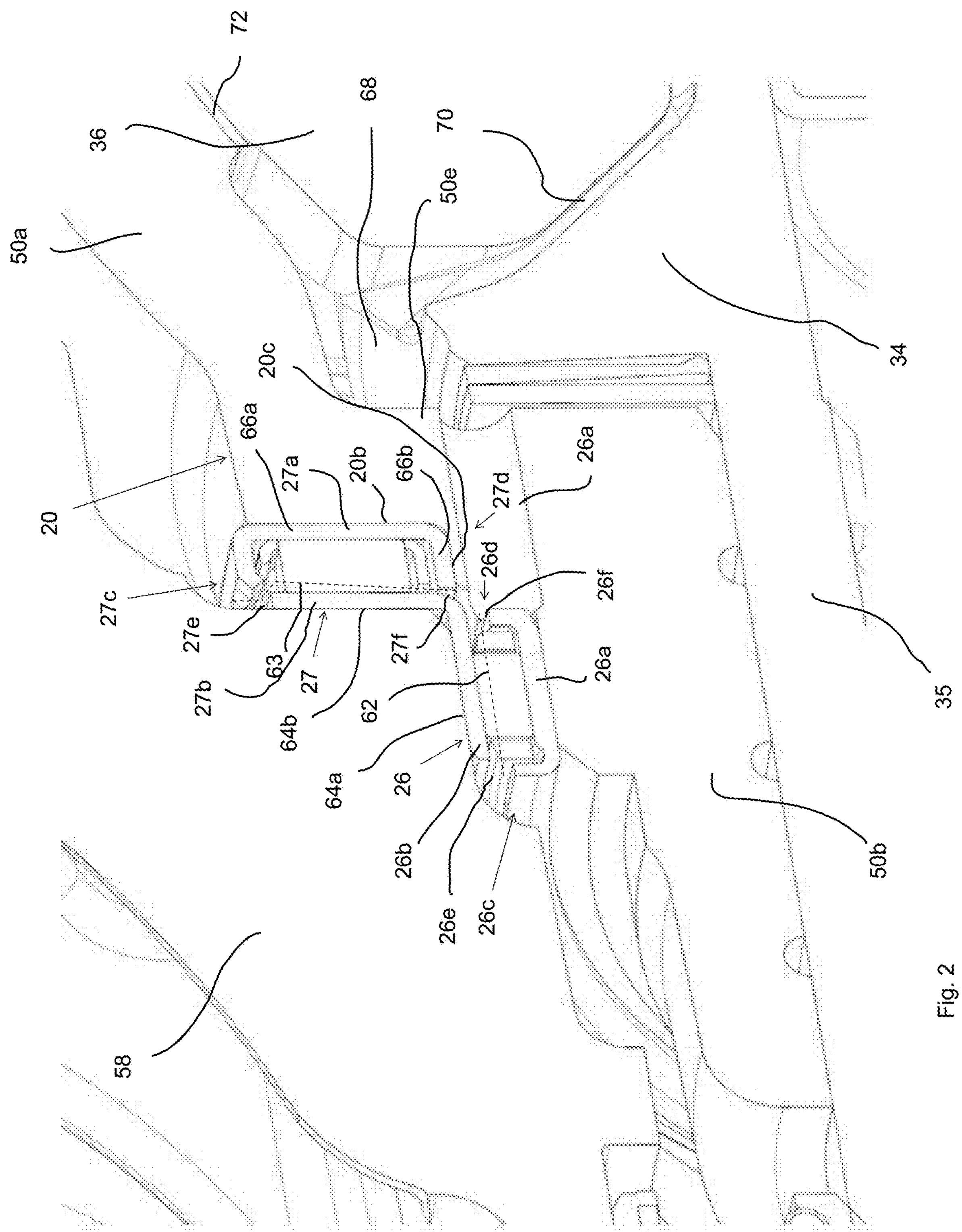
FIG. 2 shows an enlarged radial cross-sectional view of a gearbox of the drive assembly; a FIG. 3 shows a perspective view of the bearings with one of the races omitted.

FIG. 1 shows a radial cross-sectional view of a drive unit 10 of a motor vehicle drivetrain including a drive assembly, which includes a gearbox 12 including differential 14, a hollow drive shaft 16 extending into the gearbox 12, and an oil sump 18; and FIG. 2 shows an enlarged radial cross-sectional view of the gearbox 12, illustrating axially extending fluid flow holes 20*a* in a differential housing 20 of differential 14 along with a first bearing 26 and a second bearing 27 configured with fluid passages. In order to improve the supply of oil to the differential 14, differential housing 20 includes fluid flow holes 20*a* and is rotatably supported in a gearbox housing 58 by bearings 26, 27.

Gearbox 12 further includes a first output shaft 22 and a second output shaft 24 is configured for driving a first axle and a second axle of the motor vehicle drivetrain about a center axis CA and for allowing the first output shaft 22 and the second axle to rotate about the center axis CA at different speeds. Unless otherwise specified, the terms radial, axial, circumferential, and derivatives thereof are used in reference to center axis CA.

In the illustrated example, the differential 14 receives a power input from an electric motor 28 via drive shaft 16, which is a rotor shaft non-rotatably connected a rotor 30 of electric motor 28. In other example, the input shaft can be driven by an internal combustion engine alone, or in combination with an electric motor when the vehicle is a hybrid. The differential 14 further includes a first side gear 32 on a first side of the differential 14 configured for being drivingly connected to the first output shaft 22 to transmit power from input shaft 16 to the first output shaft 22 for driving a first wheel of the motor vehicle drivetrain.

The differential 14 also includes a second side gear 34 on a second side of the differential 14 configured for being drivingly connected to the second output shaft 24 to transmit power to the first output shaft 22 for driving a second wheel of the motor vehicle drivetrain. Spider gears 36 are rotatably mounted on support pins 38, which are positioned between the first side gear 32 and the second side gear 34. Each of the spider gears 36 intermeshes with both the first side gear 32 and the second side gear 34 to transmit power from the support pins 38 to the first side gear 32 and the second side gear 34. First side gear 32 includes a tubular hub 33 having an inner circumferential surface that includes teeth or splines for non-rotatably fixing first side gear 32 with respect to first output shaft 22. Second side gear 34 includes a tubular hub 35 having an inner circumferential surface that includes teeth or splines for non-rotatably fixing second side gear 34 with respect to second output shaft 24.

In the example of FIG. 1, as noted above, drive shaft 16 is the rotor shaft of an electric motor 28, with drive shaft 16 being non-rotatably fixed to rotor 30 of electric motor 28 and being rotated about center axis CA with rotor 30 by a stator 44 of electric motor 28 in a known manner. Drive shaft 16 is provided with a sun gear 46 non-rotatably fixed to the outer diameter thereof. Sun gear 46 drives a plurality of planet gears 48, which in turn drive a differential carrier 50 of differential 14 via planet carriers 52. Carrier 50 is configured for transmitting power from the planet gears 48 to the support pins 38. In particular, carrier 50 includes radially extending slots 50*d* formed therein, and each of the support pins 38 extends into a respective one of the slots 50*d*. Carrier 50 includes a rounded section 50*a*, which curves away from center axis CA, surrounding spider gears 36, and a tubular hub section 50*b* surrounding tubular hub 35 such that second side gear 34 and tubular hub 35 are rotatable with respect to carrier 50. The tubular hub 35 is rotatable within the tubular section 50*b*. On an opposite side of carrier 50 as tubular hub section 50*b*, carrier 50 includes an annular rim 50*c*.

Differential housing 20 further includes a differential cover 54 axially fixed to carrier 50 to hold first side gear 32 axially in place inside of carrier 50. More specifically, cover 54 is received within annular rim 50*c* of carrier 50 and is held axially in place by a snap ring 56 provided in a groove on an inner circumferential surface of annular rim 50*c*.

Drive unit 10 includes a housing 58 that is formed by an end housing section 58*a* axially and radially surrounding differential 14 and gears 46, 48 and an intermediate housing section 58*b* radially surrounding electric motor 28. Intermediate housing section 58*b* includes a radially extending annular wall 58*c* defining, together with first end housing section 58*a*, the housing 58 of gearbox 12. The housing 58 of gearbox 12 defines oil sump 19, which is a lubrication chamber provided within gearbox 12 that is provided with oil for lubricating differential 14 during operation via a liquid flow 60.

FIG. 2 shows an enlarged cross-sectional view of a portion of gearbox 12 illustrating fluid flow holes 20*a* and bearings 26, 27. First bearing 26 rotatably supports the differential housing 20 with respect to the gearbox housing 58. As noted with respect to FIG. 1, differential housing 20 includes axially extending holes 20*a* passing therethrough from an exterior of the differential housing 20 to an interior of the differential housing 20 for directing fluid that is between the differential housing 20 and the gearbox housing 58 into the interior of the differential housing 20.

The first bearing 26 is configured with fluid passages 62 (schematically shown in FIG. 2) allowing fluid to flow axially through the fluid passages 62 into the axially extending holes 20*a* of the differential housing 20. More specifically, the first bearing 26 is directly axially aligned with the axially extending holes 20*a* of the differential housing 20 such that the fluid flowing out of the first bearing 26 flows directly into the axially extending holes 20*a*. The first bearing 26 includes an inner race 26*a* on the tubular hub 50*b* and an outer race 26*b* on an inner annular surface 64*a* of the gearbox housing, and the fluid passages 62 are radially between the inner race 26*a* and the outer race 26*b*. The first bearing 26 includes a first axial side 26*c* facing away from the second side gear 34 and a second axial side 26*d* facing toward the second side gear 34. The first bearing 26 includes a first gap 26*e* between the inner race 26*a* and the outer race 26*b* on the first axial side 26*c* of the first bearing 26 defining an inlet of the fluid passages 62. The first bearing 26 also includes a second gap 26*f* between the inner race 26*a* and the outer race on the second axial side of the first bearing 26 defining an outlet of the fluid passages 62. The outlet of the fluid passages 62 feeds directly into the axially extending holes 20*a* of the differential housing 20.

The first bearing 26 further includes rolling elements 26*g*, which are elongated in the axial direction, radially between the inner race 26*a* and the outer race 26*b*.

The second bearing 27 also rotatably supports the differential housing 20 with respect to the gearbox housing 58 and is configured with fluid passages 63 (schematically shown in FIG. 2) allowing fluid to flow radially inwardly through the fluid passages 63 into the axially extending holes 20*a* of the differential housing 20. The second bearing 27 includes a first race 27*a* including a radially extending section 66*a* contacting a radially extending surface 20*b* of the differential housing 20. The first race 27*a* further includes an axially extending section 66*b*, which defines an inner circumferential surface of first race 27*a*, contacting an axially extending surface 20*c* of the differential housing 20. The axially extending surface 20*c* is radially outside of the axially extending holes 20*a*.

The second bearing 27 further includes a second race 27*b* contacting a radially extending surface 64*b* of gearbox housing 58. The outer race 26*b* of the first bearing 26 and the second race 27*b* of the second bearing 27 are formed of a single piece having a L-shaped cross-section. The second bearing 27 includes a radially outer side 27*c* facing away from holes 20*a* and a radially inner side 27*d* facing toward the holes 20*a*. The second bearing 27 includes a first gap 27*e* between the races 27*a*, 27*b* on the radially outer side 27*c* of the second bearing 27 defining inlets of the fluid passages 63. The second bearing 27 also includes a second gap 27*f* between the races 27*a*, 27*b* on the radially inner side 27*d* of the second bearing 27 defining an outlet of the fluid passages 63. The second bearing 27 further includes rolling elements 27*g*, which are elongated in the radial direction, axially between the first race 27*a* and the second race 27*b*.

Figure 3:
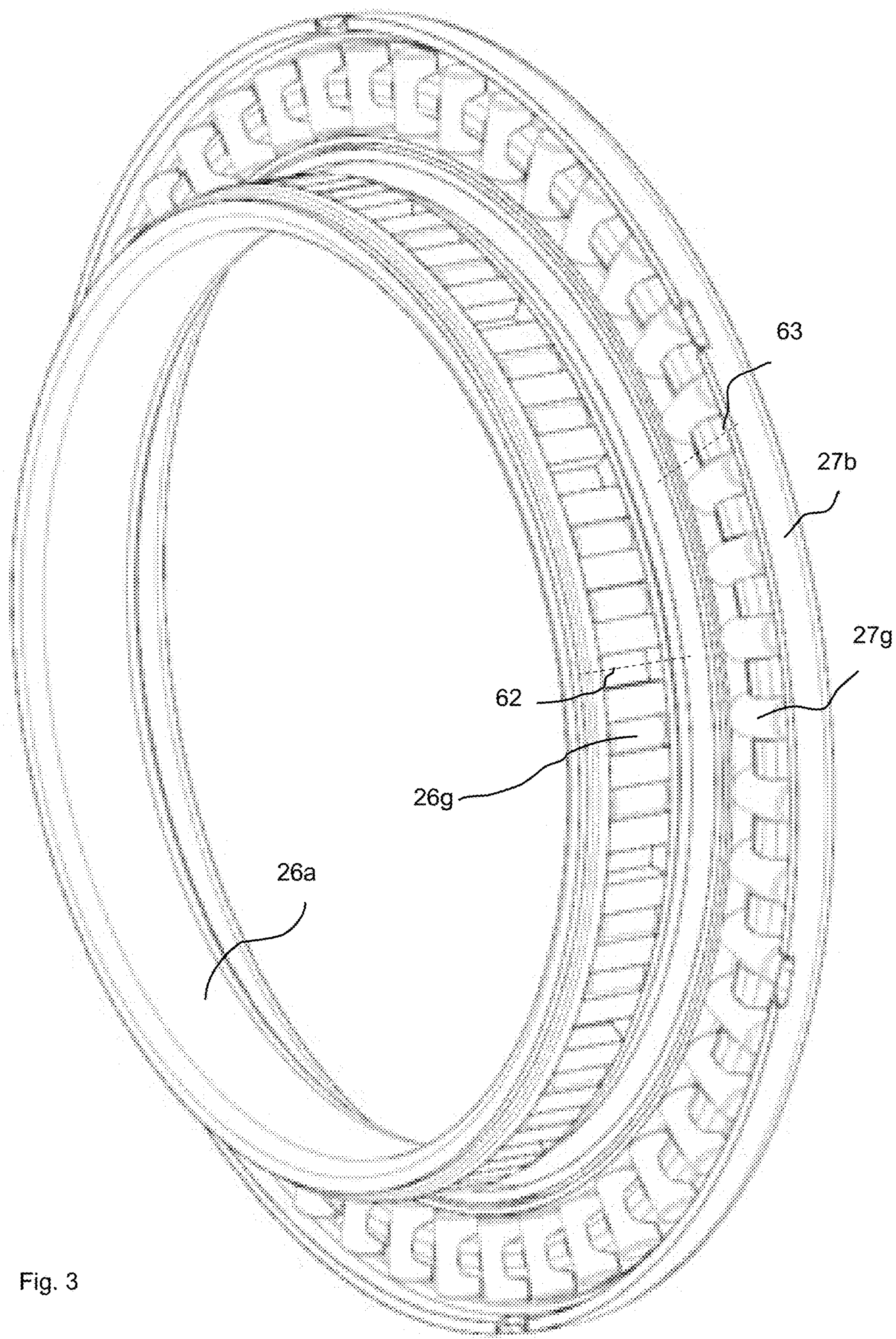

As shown in FIG. 3, which is a perspective standalone view of bearings 26, 27 with races 26*b*, 27*a* omitted, the fluid passages 62, 63 are in spaces circumferentially between the rolling elements 26*g*, 27*g*.

Referring back to FIG. 2, the differential housing 20 includes the base section 50*a* radially surrounding the spider gears 36, the tubular section 50*b* extending axially away from the base section 50*a*, and a radially extending section 50*e* extending from the tubular section 50*b* to the base section 50*a*. The second side gear 34 is axially between the tubular section 50*b* and the spider gears 36, and the axially extending holes 20*a* are formed in the radially extending section. The axially extending holes 20*a* are configured to feed fluid into an annular space 68 radially between the second side gear 34 and an inner circumferential surface of the base section 50*a*. The annular space 68 is fluidly connected to interfaces 70 between the spider gears 36 and the second side gear 34 and interfaces 72 between the spider gears 36 and the base section 50*a* of the differential housing 20.

Figure 4:
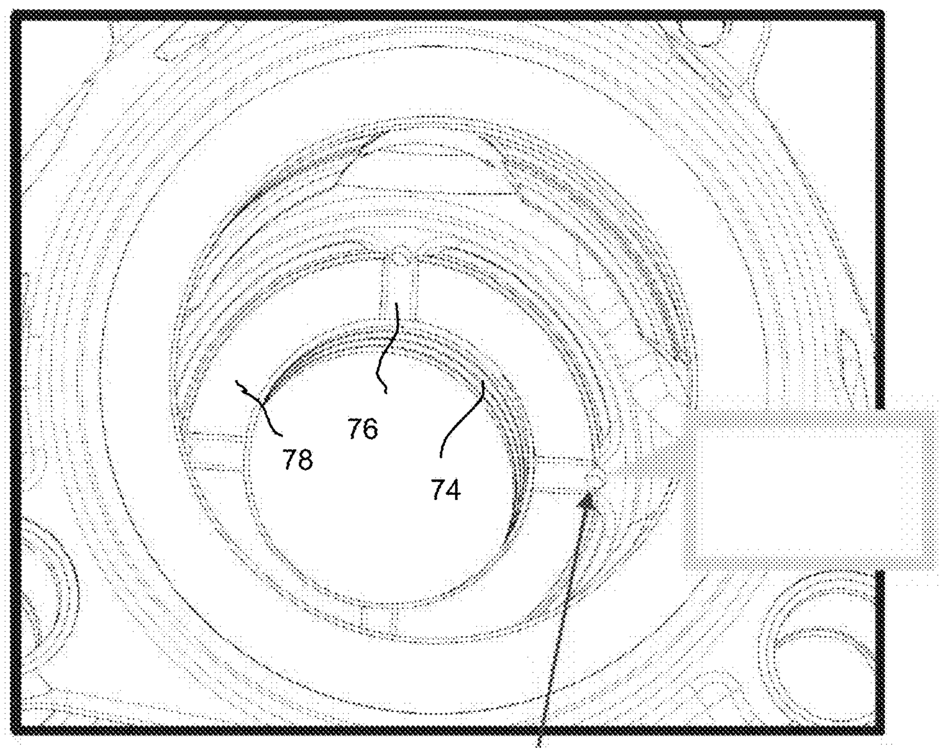
FIG. 4 shows a partial perspective view of the interior of the differential housing.
Figure 5:
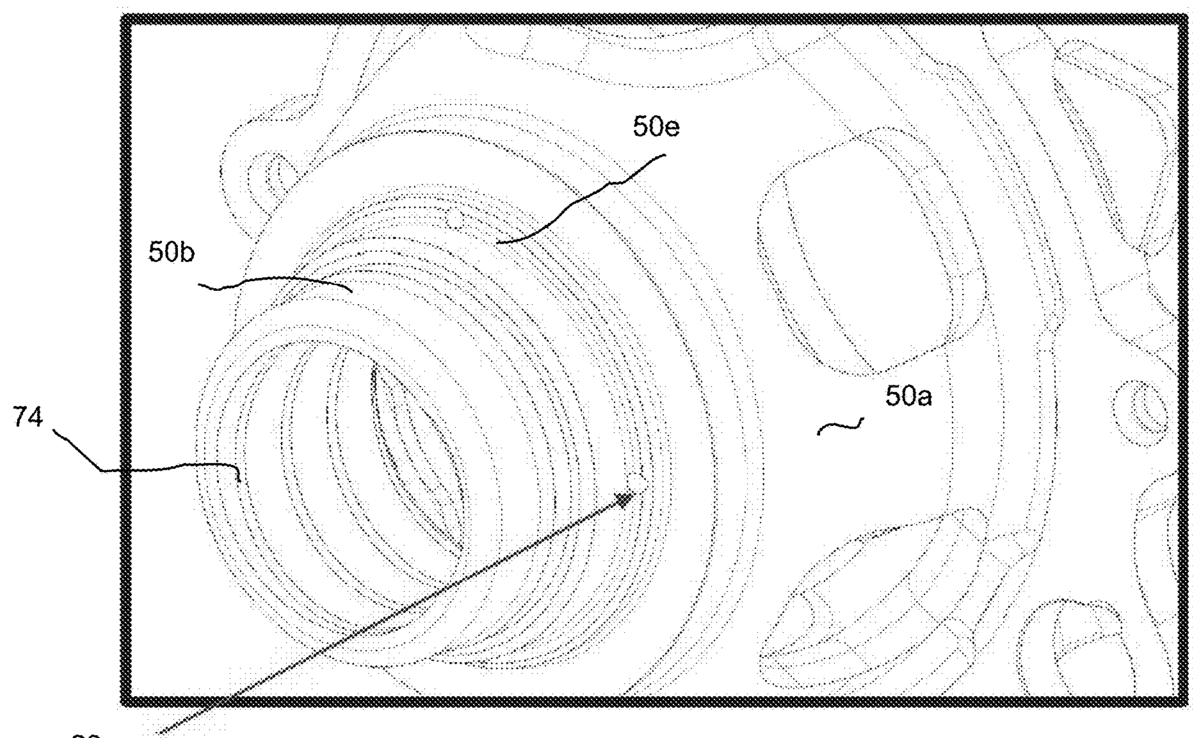
FIG. 5 shows a partial perspective view of the exterior of differential housing.

FIG. 4 shows a partial perspective view of the interior of differential housing 20, and FIG. 5 shows a partial perspective view of the exterior of differential housing 20. Referring to FIGS. 2, 4 and 5 together, an inner circumferential surface of tubular section 50*b* can include fluid flow grooves 74 for lubricating the interface between the inner circumferential surface of the of tubular section 50*b* and the outer circumferential surface of the tubular hub 35. During operation of gearbox 12, some of the fluid from holes 20*a* can flow radially inward through radially extending grooves 76 (FIG. 4) recessed into a radially extending internal surface 78, which extends from radially extending section 50*e* and along tubular section 50*b*. Grooves 76 each extend from a response one of holes 20*a* to the inner circumferential surface of tubular section 50*b* to provide fluid to the fluid flow grooves 74, which follow a helical path along the inner circumferential surface of tubular section 50*b*. After flowing through grooves 74, the fluid can flow radially outward and through bearing 26 back into holes 20*a*.

A method of constructing gearbox 12 includes creating the axially extending holes 20 in the differential housing 20; inserting the first side gear 32, the second side gear 34, support pins 38 and spider gears 36 inside the differential housing 20; and installing the differential housing 20 inside the gearbox housing 58 and positioning first bearing 26 between the differential housing 20 and the gearbox 58. The method can further include positioning the second bearing 27 between the differential housing 20 and the gearbox housing 58.

In the preceding specification, the disclosure has been described with reference to specific exemplary embodiments and examples thereof. It will, however, be evident that various modifications and changes may be made thereto without departing from the broader spirit and scope of disclosure as set forth in the claims that follow. The specification and drawings are accordingly to be regarded in an illustrative manner rather than a restrictive sense.

REFERENCE NUMERALS

10 drive unit
12 gearbox

14 differential
16 drive shaft
18 oil sump
19 oil sump
20 differential housing
20*a* axially extending holes
20*b* radially extending surface
20*c* axially extending surface
22 first output shaft
24 second output shaft
26 first bearing
26*a* inner race
26*b* outer race
26*c* first axial side
26*d* second axial side
26*e* first gap
26*f* second gap
26*g* rolling elements
27 second bearing
27*a* first race
27*b* second race
27*c* radially outer side
27*d* radially inner side
27*e* first gap
27*f* second gap
27*g* rolling elements
28 electric motor
30 rotor
32 first side gear
33 tubular hub
34 second side gear
35 tubular hub
36 spider gears
38 support pins
44 stator
46 sun gear
48 plurality of planet gears
50 carrier
50*a* base section
50*b* tubular section
50*c* annular rim
50*d* slots
50*e* radially extending section
52 planet carriers
54 differential cover
56 snap ring
58 gearbox housing
58*a* end housing section
58*b* intermediate housing section
58*c* radially extending annular wall
60 liquid flow
62 fluid passages
63 fluid passages
64*a* inner annular surface
64*b* radially extending surface
66*a* radially extending section
66*b* axially extending section
68 annular space
70 interfaces
72 interfaces
74 fluid flow grooves
76 grooves
78 radially extending internal surface

What is claimed is:

1. A gearbox for a motor vehicle drivetrain comprising:

a gearbox housing; and a differential inside of the gearbox housing configured for driving a first output shaft and a second output shaft about a center axis and for allowing the first output shaft and the second output shaft to rotate about the center axis at different speeds, the differential comprising:

a first side gear on a first side of the differential configured for being drivingly connected to the first output shaft;

a second side gear on a second side of the differential configured for being drivingly connected to the second output shaft;

a differential housing radially surrounding the first and second side gears; and a first bearing rotatably supporting the differential housing with respect to the gearbox housing, the differential housing including axially extending holes passing therethrough in an axial direction, as defined by the center axis, from an exterior of the differential housing to an interior of the differential housing for directing fluid that is between the differential housing and the gearbox housing into the interior of the differential housing.

2. The gearbox as recited in claim 1 wherein the first bearing is configured with fluid passages allowing fluid to flow axially through the fluid passages into the axially extending holes of the differential housing.

3. The gearbox as recited in claim 2 wherein the first bearing is directly axially aligned with the axially extending holes of the differential housing such that the fluid flowing out of the first bearing flows directly into the axially extending holes.

4. The gearbox as recited in claim 2 wherein the differential housing includes a tubular hub, the first bearing including an inner race on the tubular hub and an outer race on an inner annular surface of the gearbox housing, the fluid passages being radially between the inner race and the outer race.

5. The gearbox as recited in claim 4 wherein the first bearing includes a first axial side facing away from the second side gear and a second axial side facing toward the second side gear, the first bearing including a first gap between the inner race and the outer race on the first axial side of the first bearing defining an inlet of the fluid passages, the first bearing including a second gap between the inner race and the outer race on the second axial side of the first bearing defining an outlet of the fluid passages.

6. The gearbox as recited in claim 5 wherein the outlet of the fluid passages feeds directly into the axially extending holes of the differential housing.

7. The gearbox as recited in claim 5 wherein the first bearing includes rolling elements radially between the inner race and the outer race, the fluid passages being in spaces circumferentially between the rolling elements.

8. The gearbox as recited in claim 1 further comprising a second bearing rotatably supporting the differential housing with respect to the gearbox housing, the second bearing configured with fluid passages allowing fluid to flow radially through the fluid passages into the axially extending holes of the differential housing.

9. The gearbox as recited in claim 8 wherein the second bearing includes a first race contacting a radially extending surface of the differential housing.

10. The gearbox as recited in claim 9 wherein the first race of the second bearing includes an axially extending section contacting an axially extending surface of the differential housing, the axially extending surface being radially outside of the axially extending holes.

11. The gearbox as recited in claim 9 wherein the first bearing includes a first race contacting an axially extending surface of the differential housing, a second race of the first bearing and a second race of the second bearing being formed of a single piece having a L-shaped cross-section.

12. The gearbox as recited in claim 1 wherein the differential further includes:

support pins non-rotatably fixed to the differential housing; and spider gears rotatably mounted on the support pins inside of the differential and positioned between the first side gear and the second side gear, each of the spider gears intermeshing with both the first side gear and the second side gear to transmit power from the support pins to the first side gear and the second side gear.

13. The gearbox as recited in claim 12 wherein the differential housing includes:

a base section radially surrounding the spider gears and receiving the support pins;

a tubular section extending axially away from the base section; and a radially extending section extending from the tubular section to the base section, the second side gear being axially between the tubular section and the spider gears, the axially extending holes being formed in the radially extending section.

14. The gearbox as recited in claim 13 wherein the axially extending holes are configured to feed fluid into an annular space radially between the second side gear and an inner circumferential surface of the base section.

15. The gearbox as recited in claim 14 wherein the annular space is fluidly connected to interfaces between the spider gears and the second side gear and interfaces between the spider gears and the base section of the differential housing.

16. The gearbox as recited in claim 13 further comprising a tubular hub non-rotatably fixed to the second side gear, the tubular hub being rotatable within the tubular section of the differential housing.

17. The gearbox as recited in claim 1 wherein the gearbox housing defines a sump for receiving oil for lubricating the gearbox.

18. A method of constructing a gearbox for a motor vehicle drivetrain, the method comprising:

creating axially extending holes in a differential housing;

inserting a first side gear, a second side gear, support pins and spider gears inside the differential housing, the spider gears being rotatably mounted on the support pins and positioned between the first side gear and the second side gear, each of the spider gears intermeshing with both the first side gear and the second side gear to transmit power from the support pins to the first side gear and the second side gear for allowing the first side gear and the second side gear to rotate about a center axis at different speeds; and installing the differential housing inside a gearbox housing and positioning a first bearing between the differential housing and the gearbox, the first bearing being configured with fluid passages allowing fluid to flow through the fluid passages into the axially extending holes of the differential housing, the axially extending holes passing from an exterior of the differential housing to an interior of the differential housing for directing fluid that is between the differential housing and the gearbox housing into the interior of the differential housing.

19. The method as recited in claim 18 wherein the first bearing is configured with fluid passages allowing fluid to flow axially through the fluid passages into the axially extending holes of the differential housing.

20. The method as recited in claim 19 further comprising positioning a second bearing between the differential housing and the gearbox housing, the second bearing being configured with fluid passages allowing fluid to flow radially inward through the fluid passages of the second bearing into the axially extending holes of the differential housing.

* * * * *